Nov. 3, 1964 E. H. LAND 3,155,024
PHOTOGRAPHIC APPARATUS
Original Filed Nov. 28, 1956 4 Sheets-Sheet 1

INVENTOR.
Edwin H. Land
BY Brown and Mikulka
and Robert E. Corb
ATTORNEYS

Nov. 3, 1964  E. H. LAND  3,155,024
PHOTOGRAPHIC APPARATUS
Original Filed Nov. 28, 1956  4 Sheets-Sheet 2

INVENTOR.
Edwin H. Land
BY Brown and Mikulka
and
Robert E. Corb
ATTORNEYS

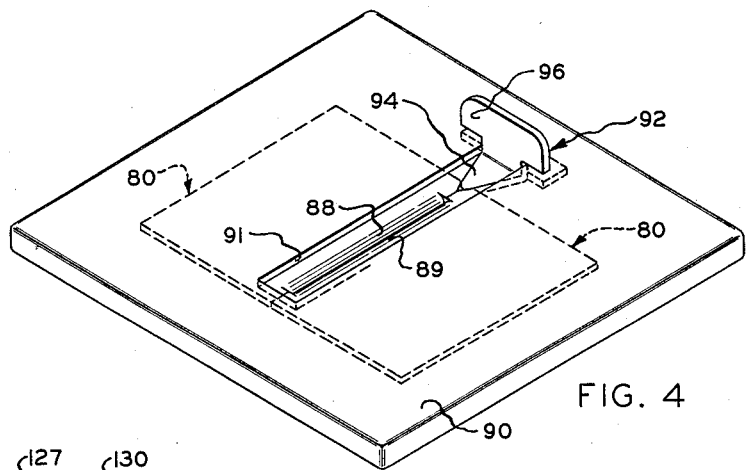
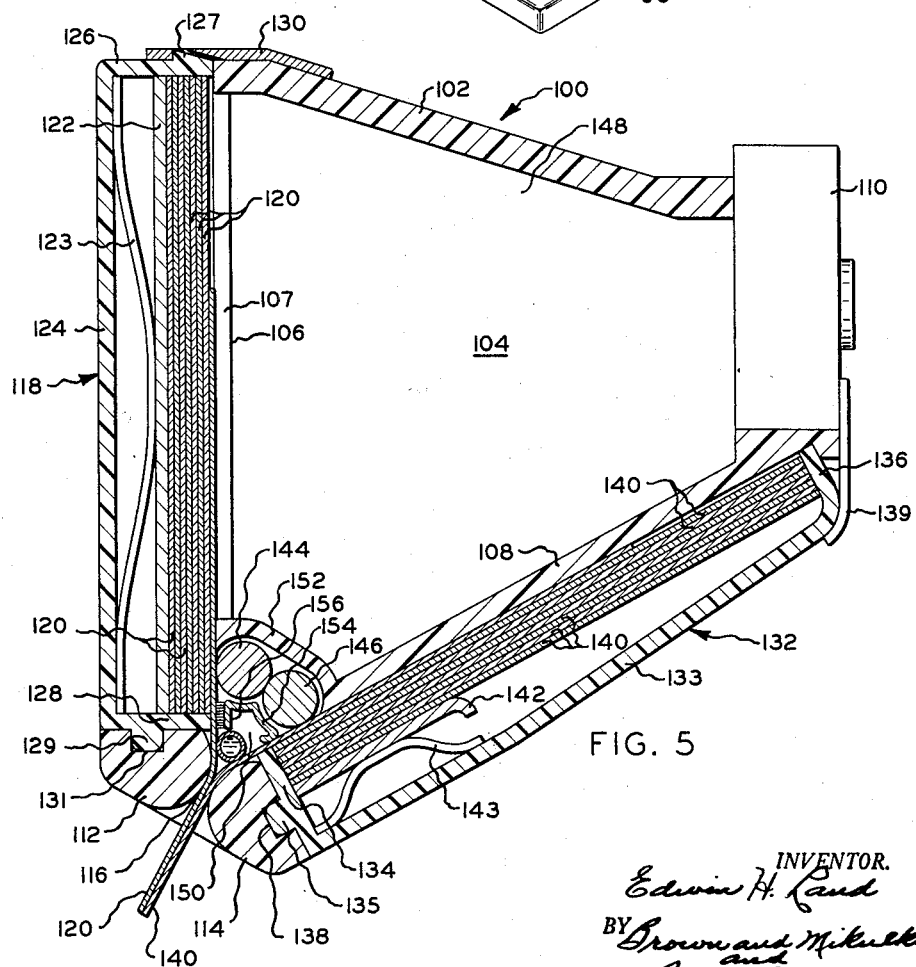

INVENTOR.
Edwin H. Land
BY Brown and Mikulka
and
Robert E. Corb
ATTORNEYS

United States Patent Office 3,155,024
Patented Nov. 3, 1964

3,155,024
PHOTOGRAPHIC APPARATUS
Edwin H. Land, Cambridge, Mass., assignor to Polaroid Corporation, Cambridge, Mass., a corporation of Delaware
Original application Nov. 28, 1956, Ser. No. 624,787. Divided and this application May 19, 1961, Ser. No. 116,640
6 Claims. (Cl. 95—13)

This invention relates to photographic apparatus for exposing and processing photosensitive materials to produce useful photographic images.

This application is a division of my copending application Serial No. 624,787, filed November 28, 1956, entitled "Photographic Process and Apparatus," now abandoned.

In conventional photographic processes, the speed of the photosensitive material is considered fixed and because processing is standardized, the speed of the overall process for producing a useful print is also fixed for all practical purposes. The exposure conditions, that is, those factors including the intensity of illumination and the reflectivity of the subject characterized as brightness and, more correctly, luminance, which control the light reaching the exposure means, may vary between exposures or may not be subject to control so that proper exposure, that is, exposure which is appropriate to the speed of the photosensitive material for producing a useful image of predetermined contrast, must be controlled. This control over exposure is usually effected by varying the duration of exposure and/or the exposure stop employed.

In my copending application Serial No. 564,492, filed April 19, 1956, now abandoned, there is disclosed a method of photography involving the formation of a positive print directly from an exposed negative material containing a latent image by diffusion transfer reversal, effected by a fluid composition distributed on the negative material. This application describes how the overall speed of the process for producing a useful, high quality positive print, which overall speed is based on the curve relating the original exposure of the negative to the density in the ultimate positive print, may exceed the ASA rated speed of the negative material by a factor, for example, of from 1 to 50, and the overall speed of the process and/or the contrast of the resulting print may be controlled or varied by proper selection of the particular fluid processing composition employed to produce the print.

Objects of the invention are: to provide a novel photographic apparatus for producing a plurality of useful positive photographic prints employing negative materials having substantially the same ASA rated speed, and wherein the exposures for producing said prints are substantially different and the equivalent overall speed of the process for producing each print is controlled in accordance with the exposure by a proper selection of the fluid composition employed to produce the print and including means for spreading a fluid processing composition in a layer between an exposed photosensitive silver halide emulsion and an image-receiving layer superposed therewith; to provide photographic apparatus as described in the form of a camera whereby a plurality of substantially different exposures of equal duration are made with the same exposure stop, and wherein a container of the fluid composition, selected to give an overall speed for which each exposure is proper, may be supplied for spreading between the exposed photosensitive emulsion and an image-receiving layer; and to provide a camera as described which is useful under a wide range of exposure conditions and is characterized by its simplicity and inexpensiveness of construction and ease of operation, and including means for providing a pinhole aperture and shutter means for predeterminedly limiting the duration of pinhole exposure to a fraction of a second.

A number of forms of apparatus, usually cameras, of the general type with which the persent invention is concerned have been proposed and these usually include means for storing a photosensitive sheet and a second sheet, exposing the photosensitive sheet, superposing the exposed photosensitive sheet with the second sheet and distributing a fluid processing composition between the superposed sheets. It is the usual practice to provide the fluid composition in a rupturable container associated with one of the sheets and to move the container and superposed sheets between a pair of pressure-applying members for causing the fluid contents of the container to be discharged therefrom and spread in a layer between the sheets. In my copending application Serial No. 522,605, filed July 18, 1955 (now abandoned and replaced by application Serial No. 820,266 filed June 15, 1959), now Patent No. 3,047,387, there is disclosed a method of photography, together with photographic products useful therein, wherein a container carrying a fluid composition is withdrawn from association with the sheets, and its fluid contents are discharged in a mass on one of the sheets as the container is withdrawn, prior to movement of the sheets between a pair of pressure-applying members for spreading the fluid in a layer between the superposed sheets. Containers of this type are generally elongated and each is positioned transversely of the sheets so that its fluid contents are discharged in an elongated mass transversely of the sheets as the container is withdrawn in the direction of its elongation. As a rule, the container is associated with the sheets or, in any event, is loaded into the camera and located in position for withdrawal therefrom at the same time the sheets are loaded into the camera.

A further object of the present invention is to provide photographic apparatus wherein a photosensitive sheet is exposed and is processed in conjunction with a second sheet by a fluid composition spread in a layer between said sheets, and including means whereby an elongated fluid-filled container may be introduced into said camera between said sheets in a position transverse of said sheets and may be withdrawn from between the sheets in the direction of its elongation whereby the fluid contents of said container are ejected therefrom and deposited on one of said sheets.

Still another object of the invention is to provide a photographic apparatus as described, including means defining a chamber wherein portions of a photosensitive sheet and a second sheet are located with a fluid-receiving space therebetween and are isolated from the remainder of said photosensitive sheet, and wherein an elongated container may be introduced into and withdrawn from said fluid-receiving space in the direction of its elongation for depositing a fluid processing composition in said space on one of said sheets, without danger of exposing the remainder of said photosensitive sheet.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a fragmentary perspective view illustrating the embodiment of FIG. 3;

FIGS. 5, 6 and 7 are elevational views, partially in section, illustrating other forms of cameras embodying the invention; and adapted to processing in accordance with the invention.

Figures 1, 2, 8:
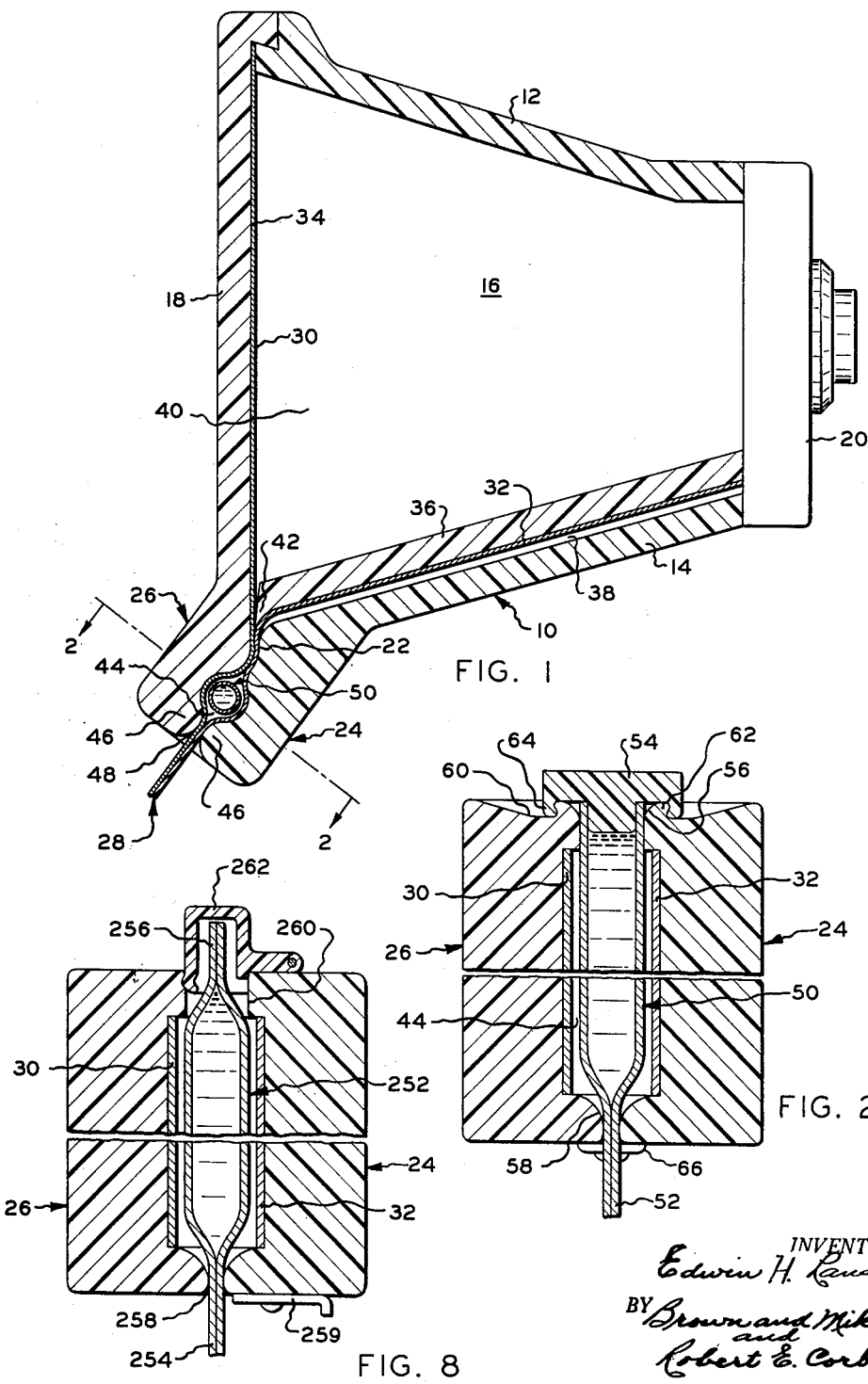
FIGURE 1 is a diagrammatic elevational view, partially in section, of one form of camera embodying the present invention.
FIG. 2 is a sectional view taken along the line 2—2 of FIG. 1.
FIG. 8 is a fragmentary perspective view, partially in section, of a portion of the camera of FIG. 1 showing another embodiment of one component of the invention.

The apparatus of the invention is designed for exposing a photosensitive sheet and thereafter treating the exposed photosensitive sheet with a fluid processing reagent in conjunction with a second sheet to produce a positive photographic print.

The expression "second sheet" as used herein is intended to mean a second sheet which may merely cooperate with the photosensitive sheet to aid in the spreading of the processing fluid on the photosensitive sheet or, in a preferred form, provides a support for a positive print formed by diffusion transfer reversal. The photosensitive sheet may comprise a support and a layer of any of the light-sensitive materials known to the art and, in a preferred form, comprises a silver halide emulsion. The fluid processing composition is selected in accordance with the particular light-sensitive material which is employed and the type of processing intended and, in a preferred form wherein the photosensitive material is a silver halide emulsion and it is intended that a print be produced by silver halide diffusion transfer-reversal on the second sheet, includes a silver halide developer and a silver halide solvent. The developer reduces exposed silver halide to silver and the solvent reacts with unreduced silver halide to form a soluble silver complex which is reduced in the presence of a silver precipitating environment to form a positive print, preferably on the second sheet. Further examples of processes of this type, together with materials useful therein, are described in detail in Patent No. 2,543,181, issued February 27, 1951, in the name of Edwin H. Land.

In conventional photographic methods and apparatus of the present type, the negative material is exposed and thereafter processed to produce a negative image and/or a positive print. Exposure is usually controlled so that it is suited for the rated speed of the negative material whereby the negative image or print produced by a more or less standard process is useful and is of an optimum quality. The speed of the negative material is fixed and optimum exposure is obtained by varying the exposure stop and/or the duration of exposure in accordance with the luminance of the subject being photographed. The term "luminance," sometimes characterized as "brightness," is used herein to mean the absolute amount of light from a subject and is usually measured in candles per unit area or lamberts.

As previously noted in my copending application Serial No. 564,492, there is described a photographic process whereby the equivalent overall speed of the process for producing a positive print by diffusion transfer reversal, which speed is based on the curve relating the original exposure of the negative to the density in the ultimate positive print, may be comparatively fast and is controlled by the fluid processing agent employed to produce the print.

The apparatus of the present invention is particularly adapted for effecting the exposure and processing of photosensitive materials by the above method to produce positive prints wherein the equivalent overall speed of the process is controlled by the particular processing agent selected, which selection is made in accordance with the exposure. Here, it would not be necessary to vary exposure as is done in conventional photographic methods to suit the particular speed of the negative material, but exposure may be left to be determined by chance or existing conditions and the equivalent overall speed of the process is controlled so as to produce a useful and high quality positive print with the given exposure. Accordingly, the apparatus of the invention may be provided with exposure means comprising a single stop, or a limited number of stops, and a shutter of a very simple and inexpensive design capable of providing a single speed or a limited number of speeds. When the camera comprises a single speed, single stop exposure means, the operator need merely determine the exposure when the exposure is made, and thereafter select the appropriate processing composition which will give an equivalent overall speed for which the exposure is proper.

In my aforementioned copending application Serial No. 564,492, there is given, by way of example, formulations of processing solutions which, when used to process a silver halide emulsion, namely a gelatino iodobromide emulsion sold by Eastman Kodak under the name "Royal Pan," and having an ASA rated speed of approximately 370, gave rise to much higher equivalent overall speeds ranging from 900 to 2780 reciprocal meter candle seconds (m.c.s.). It has been found that by using a similar formulation with different amounts of sodium hydroxide and sodium thiosulfate, and different developers, a wide range of equivalent overall speeds may be obtained with a single emulsion. In this manner a range of speeds suitable for practical use in the process of the invention and differing from one another by a factor of two were obtained using an emulsion of the "Royal Pan" type on a paper support. The formulation of processing solutions was adjusted to produce equivalent overall speeds ranging from 25 to 1000 with each speed being, nominally, twice the previous speed, with the same emulsion.

Processing solutions were prepared in substantially the same manner as described in application Serial No. 564,492 and were spread in a thin layer, approximately three thousandths of an inch thick, between each emulsion and a silver-receptive stratum and the three strata were maintained in superposed relation for a processing period of approximately 60 seconds. The following non-limiting examples illustrate the range of equivalent overall speeds which may be achieved with various processing solutions and the same silver halide emulsion:

*Example I*

The formulation of a processing solution given an equivalent overall speed of 25 reciprocal m.c.s. was as follows:

| | |
|---|---|
| Sodium sulfite _____g__ | 17.10 |
| Sodium carboxymethyl cellulose (high viscosity) g__ | 9.51 |
| Sodium hydroxide _____g__ | 19.14 |
| Sodium thiosulfate _____g__ | 14.4 |
| Hydroquinone _____g__ | 14.25 |
| Metol _____g__ | 1.2 |
| Water _____cc__ | 265 |

*Example II*

The formulation of a processing solution giving an equivalent overall speed of 50 reciprocal m.c.s. was as follows:

| | |
|---|---|
| Sodium sulfite _____g__ | 17.10 |
| Sodium carboxymethyl cellulose (high viscosity) g__ | 9.51 |
| Sodium hydroxide _____g__ | 19.14 |
| Sodium thiosulfate _____g__ | 14.4 |
| Hydroquinone _____g__ | 14.25 |
| Metol _____g__ | 2.4 |
| Water _____cc__ | 265 |

Example III

The formulation of a processing solution giving an equivalent overall speed of 130 reciprocal m.c.s. (nominally 100) is as follows:

| | | |
|---|---|---|
| Sodium sulfite | g | 17.10 |
| Sodium carboxymethyl cellulose (high viscosity) | g | 9.51 |
| Sodium hydroxide | g | 10.14 |
| Sodium thiosulfate | g | 14.4 |
| Hydroquinone | g | 14.25 |
| Amidol | g | 1.5 |
| Water | cc | 265 |

Example IV

The formulation of a processing solution giving an equivalent overall speed of 220 reciprocal m.c.s. (nominally 200) was as follows:

| | | |
|---|---|---|
| Sodium sulfite | g | 17.10 |
| Sodium carboxymethyl cellulose (high viscosity) | g | 9.51 |
| Sodium hydroxide | g | 10.14 |
| Sodium thiosulfate | g | 3.6 |
| Hydroquinone | g | 18 |
| Amidol | g | .3 |
| Water | cc | 265 |

Example V

The formulation of a processing solution giving an equivalent overall speed of 400 reciprocal m.c.s. was as follows:

| | | |
|---|---|---|
| Sodium sulfite | g | 17.10 |
| Sodium carboxymethyl cellulose (high viscosity) | g | 9.51 |
| Sodium hydroxide | g | 10.14 |
| Sodium thiosulfate | g | 39.6 |
| Amidol | g | 4.2 |
| Water | cc | 265 |

Example VI

The formulation of a processing solution giving an equivalent overall speed of 800 reciprocal m.c.s. was as follows:

| | | |
|---|---|---|
| Sodium sulfite | g | 17.10 |
| Sodium carboxymethyl cellulose (high viscosity) | g | 9.51 |
| Sodium hydroxide | g | 14.10 |
| Sodium thiosulfate | g | 5.04 |
| Amidol | g | 4.2 |
| Water | cc | 265 |

Example VII

The formulation of a processing solution giving an equivalent overall speed of 1000 reciprocal m.c.s. was as follows:

| | | |
|---|---|---|
| Sodium sulfite | g | 17.10 |
| Sodium carboxymethyl cellulose (high viscosity) | g | 9.51 |
| Sodium hydroxide | g | 10.14 |
| Sodium thiosulfate | g | 3.6 |
| Amidol | g | 8.55 |
| Water | cc | 265 |

As noted in application Serial No. 564,492, it is possible with processes of this type to achieve very fast equivalent overall speeds which may be as high, for example, as 1 to 50 times the ASA rated speed of the negative material employed. This is demonstrated by Examples IV through VIII of said application, wherein a negative material having an ASA rated speed of 100 was exposed and processed to produce, respectively, equivalent overall speeds of 2000, 2710, 1760, 900 and 1000 reciprocal m.c.s. With this in mind and when it is considered that the negative material is intentionally underexposed in this process, it will be readily appreciated that it is possible to provide very simple and inexpensive cameras wherein the exposure means comprises a pinhole aperture, instead of a lens and stop, and that will be capable of producing high quality prints under most conditions with exposures of acceptably short duration, e.g., a fraction of a second, with an inexpensive shutter. Variations in the overall speed of the process to suit different exposures will be achieved by providing a multiplicity of containers of fluid processing agents capable of producing a range of overall speeds suitable for predetermined exposures and selecting the proper fluid composition to be used according to the exposure.

The apparatus of the invention is shown for purposes of illustration in the form of a camera, a construction for which it is particularly suited, arranged for exposing a frame of a photosensitive sheet and processing the exposed frame by superposing it with a second sheet and spreading a fluid composition in a layer between the sheets. The apparatus includes a housing providing a first chamber wherein a frame of the photosensitive sheet is positioned for exposure, a second chamber wherein the second sheet is positioned during exposure of the photosensitive sheet, and at least a third chamber which is isolated in a lighttight fashion from at least the first chamber. Means, in the form of a pair of pressure-applying members, are provided at one side of this third chamber for superposing the sheets and spreading a fluid composition therebetween as the sheets are withdrawn from the third chamber between the pressure-applying members.

The third chamber is so constructed and arranged that portions of the photosensitive and second sheets may be located therein with a fluid-receiving space between the sheets. Also associated with the third chamber are means whereby an elongated container, filled with a fluid processing composition, may be introduced into the camera into the fluid-receiving space between the sheets and then withdrawn in the direction of its elongation transversely of the sheets while the container is progressively compressed to effect the discharge of its fluid contents into the fluid-receiving space. The third chamber, being isolated from the first chamber, permits the introduction of a container into the fluid-receiving space between the sheets without exposing the exposure frame of the photosensitive sheet located in the first chamber. The construction of the third chamber is such that it may be sealed against the admission of light following withdrawal of the container, permitting the photosensitive and second sheets to be moved through the container between the pressure-applying members in a lighttight environment.

Only a portion of the photosensitive sheet located adjacent the exposure frame is positioned within the third chamber during introduction and withdrawal of a container and is subjected to exposure to light which may enter the chamber. The third chamber may also be isolated from the second chamber as well, although, in a preferred form, this is unnecessary since the second sheet is not sensitive to light and the second chamber for storing the second sheet is light-sealed from the first chamber. Also, it is possible to eliminate the second chamber entirely and store the second sheet in what is defined as the third chamber.

Cameras embodying the present invention may take a number of different forms for use with a variety of different types of photosensitive and second sheets and include cameras for use with photosensitive and second sheets in roll form with the photosensitive sheet comprising a series of exposure frames; photosensitive and second sheets in cut form, that is, as individual sheets with each photosensitive sheet including a single exposure frame and with the sheets either separate from one another or connected by leaders; and for use with a single exposure film assemblage comprising a photosensitive and second sheet secured together and adapted to be introduced into and withdrawn from the camera. The camera may be of the folding type, so-called box type or miniature type, and may be intended for use with photographic sheet materials having light-transmitting supports or backings or opaque backings. The present invention is also adapted to incorporation into the structure of film magazines or holders of either the cut or roll film type adapted to be associated with another means for making an exposure or may be incorporated into apparatus such as an X-ray cassette wherein the photosensitive material is exposed to penetrative radiation.

Reference is now made to FIGS. 1 and 2 of the drawings wherein there is shown apparatus embodying the invention in the form of a camera. The camera comprises a housing, designated 10, having an upper wall 12, lower wall 14, side walls 16 and a rear wall 18. An exposure means comprising, for example, a conventional lens and shutter assembly 20 is mounted on the forward portions of the upper, lower and side walls, all of which may converge toward the front of the housing. Rear wall 18 and lower wall 14 are disposed at oblique angles with respect to one another and form a passage 22 at their intersection through which a film assemblage may be introduced into the camera. Lower wall 14 and rear wall 18 are provided, respectively, with downwardly and rearwardly extending enlarged sections 24 and 26 located on opposite sides of passage 22.

A photographic assemblage 28 comprising a photosensitive sheet 30 and a second sheet 32 is adapted to be introduced through passage 22 into the camera wherein the sheets are positioned during exposure. The two sheets comprising photographic assemblage 28 are substantially coextensive with one another and are secured in face-to-face relation at least around their margins. Photosensitive sheet 30 includes a layer of photosensitive material on its inner surface comprising an exposure frame and the two sheets are opaque to actinic light so that the photosensitive material comprising the exposure frame is shielded from exposure when the two sheets are secured in superposition at least around the margins of said exposure frame. The portion of the second sheet superposed with the exposure frame must be separated therefrom in order to permit exposure of the photosensitive material.

As a means for positioning the photosensitive sheet for exposure within housing 10, side walls 16 are provided with grooves or tracks 34 located adjacent rear wall 18. The forward surface of rear wall 18 may be so located as to aid in properly positioning the photosensitive sheet for exposure. The camera includes an intermediate wall 36 located adjacent and generally parallel with lower wall 14 and cooperating with the latter to define a storage chamber 38 within which the second sheet is positioned apart from the photosensitive sheet during exposure of the latter. Intermediate wall 36 separates chamber 38 from the exposure chamber, designated 40, defined by the intermediate wall 36, upper wall 12, side walls 16 and rear wall 18.

Photographic assemblage 28 is adapted to be introduced into the camera with sheets 30 and 32 secured together in superposed relation, passage 22 being just wide enough for this purpose so that the sides of the passage engage the sheets and aid in preventing the admission of light through the passage. Accordingly, means are provided for separating the two sheets and guiding them into proper exposure positions, i.e., with sheet 30 retained in guide tracks 34 and sheet 32 located in storage chamber 38. In the form shown this last-mentioned means comprises a wedge-shaped portion 42 of intermediate wall 36 having a sharpened edge which extends into passage 22 in position to enter between the leading ends of the superposed sheets as they are introduced into the passage. The sheets, as they are moved through the passage, are spaced apart by wedge-shaped portion 42 and guided into their respective exposure positions.

Enlarged sections 24 and 26 of walls 14 and 18 are so formed as to provide a third and generally elliptically shaped chamber 44 located exterior of passage 22 and communicating therewith. The enlarged sections also include pressure-applying portions 46 having generally cylindrical surfaces defining a gap 48 of substantially fixed width in the side of chamber 44 opposite passage 22. The arrangement of gap 48 and passage 22 is such that an assemblage 28 can be introduced through gap 48, third chamber 44 and passage 22 without bending and with sheets 30 and 32 located in superposition. Gap 48 between pressure-applying portions 46 is of a substantially predetermined width greater than the thickness of the sheets comprising assemblage 28 whereby a fluid composition provided between the sheets is caused to be spread in a layer as the sheets are withdrawn from the camera through the gap. Pressure-applying portions 46 are shown as being somewhat enlarged so as to strengthen and add rigidity to the structure so that the width of the gap will remain substantially constant during spreading of the fluid, and may also be provided with suitable strengthening means for this purpose. As an alternate construction the pressure-applying means may comprise some type of device, for example a metal plate having a slot therethrough secured to enlarged sections 24 and 26 with the slot located in the position of gap 48 and serving the same purpose.

The structure of the camera as shown and described is such as to lend itself to formation from plastic materials, for example, by molding, with the result that the camera can be produced simply and inexpensively. The aforementioned strengthening means for the pressure-applying portions of the camera may take the form, for example, of rigid metal bars extending through the plastic material comprising portions 46 on opposite sides of the gap 48 and may, for example, be molded into the plastic material.

The fluid processing composition to be spread between the sheets is provided in an elongated tubular container, designated 50, of the type described in detail in my aforementioned copending application Serial No. 522,605, filed July 18, 1955. Container 50 may be cylindrical, as shown, or oblate in cross section, and is formed of sheet material which is sufficiently rigid to resist deformation due to hydraulic pressure in its fluid contents, yet is flexible enough so that the container can be compressed or flattened by movement between a pair of pressure-applying members. The container is substantially longer than the transverse dimension of the sheets to be processed and includes a liquid-carrying cavity substantially equal in length to the width of the exposure frame. Both ends of the fluid-filled container are sealed closed with at least one of the ends being sealed so that it will open, for example, in response to hydraulic pressure generated in the fluid contents of the container. In the form shown in FIG. 2, the leading end of the container, designated 52, is sealed by compressing the wall of the container and securing or bonding the inner faces thereof to one another. A plug 54 having recessed flanges 64 is provided in the opposite or trailing end of the container for closing said end.

Container 50 is adapted to be introduced between the portions of sheets 30 and 32 located within third chamber 44 in a position transversely of the sheets. For this purpose the end walls of chamber 44, e.g., side walls 16, are provided with openings, designated 56 and 58, located opposite one another in the end of the chamber. Opening 56 is shaped to conform substantially to the shape of the container and plug so that the container may be introduced into chamber 44 therethrough. Opening 58 at the opposite end of chamber 44 is in the form of a narrow slot having dimensions just sufficient to admit the container in a flattened condition whereby the sides of the opening will engage the container and function as pressure-applying members for progressively compressing the container as it is withdrawn, in the direction of its leading end, through opening 58. The container is adapted to be introduced into chamber 44 between the sheets until the container is located, as shown in FIG. 2, with the leading end portion extending through opening 58 exteriorly of the camera, where it provides a leader by which the container may be grasped for withdrawing the container through the opening. A recess 60 is provided in the wall surrounding opening 56 together with a projecting lip 62 immediately surrounding the opening. Flange 64 of plug 54 is so formed as to extend around and engage lip 62 when the container is in the position shown, whereby a lighttight seal is formed between the plug and the end wall of chamber 44, and the plug is retained in covering relation to opening 56 when the container is withdrawn from the chamber through opening 58.

In order to permit introduction of the container between portions of sheets 30 and 32 located within chamber 44, these portions of the sheets must first be spaced apart from one another. This may be accomplished, in the form shown in FIG. 1, by continuing to push the sheets through gap 48 into chamber 44 after the sheets have been moved into exposure position and arrested whereby the portions of the sheets within chamber 44 are caused to bend or buckle apart from one another. The sheets in this region may be prefolded or creased to facilitate and insure buckling or bending in opposite directions at the desired locations, and are not secured to one another at their margins in this region.

As the container is withdrawn from between the portions of sheets 30 and 32 located within chamber 44, its trailing end is withdrawn from engagement with plug 54, thereby providing an open mouth through which the fluid contents of the container are discharged in the form of an elongated mass across the sheets as portions of the container succeeding from the leading end are compressed by the walls of opening 58. Generally the fluid should be quite viscous so that it can be readily controlled after being discharged, i. e., so that it will not flow freely of its own accord from the elongated mass which it first assumes when it is discharged from the container. It has been found that a fluid should have a viscosity ranging between 100 and 200,000 centipoises at a temperature of 20° C. if the fluid is to be spread readily from the elongated mass between the sheets.

Light-sealing means, for example, in the form of a sliding member 66 mounted on one of side walls 16 is provided for closing opening 58 following withdrawal of a container therefrom. Opening 56, as previously noted, is closed by plug 54 so that the only opening into chamber 44 from the exterior of the camera is gap 48 through which sheets 30 and 32 project and are adapted to be withdrawn. In an alternative form of the camera, suitable pressure-applying means may be provided in association with opening 58 for compressing the wall of the container as it is withdrawn from chamber 44 and this pressure-applying means may also act as a light-sealing element for closing the opening after the container has been withdrawn.

As the sheets are withdrawn through gap 48 from chamber 44, hydraulic pressure is generated within the fluid between the sheets, causing the fluid to be spread in a thin layer therebetween. Pressure-applying portions 46, of course, engage the surface of the sheets very closely so that substantially no light can enter chamber 44 and thereby expose other portions of the photosensitive sheet as they are drawn through the chamber. The layer of processing fluid, being quite viscous, causes the two sheets to remain adhered to one another as they are drawn from the camera; and, since the sheets are opaque, prevents exposure of the frame of the photosensitive sheet. To insure that light does not enter between the superposed sheets, a material, such as a light-opaque or light-absorbing pigment, may be provided in the processing fluid. At the end of a predetermined processing period, the photosensitive and second sheets may be stripped apart.

In another form, the container may be sealed at both ends in the same manner, that is, by compressing the walls together and either adhering them in this position or holding them together by suitable retaining means. This type of container, designated 252, is shown in FIG. 8 of the drawings and comprises, respectively, leading and trailing ends 254 and 256 both formed by sealing or adhering the walls together, for example, by fusion of the material comprising the inner surfaces of the walls. To adapt it to use with container 252, the camera includes a slot 258 in one end of the processing chamber through which the container is withdrawn, slot 258 being substantially the same as the above described opening 58 for compressing the container as it is moved through the slot and a suitable closure 259, similar to closure member 66, is provided for closing the slot. An opening 260 is provided in the opposite end of the processing chamber whereby the container may be introduced into the chamber between the sheets and a pivotable cap 262 is provided for closing opening 260 against the admission of light into the processing chamber.

The structure of each of containers 50 and 252 and the camera are such that the container is introduced into the third chamber through an opening in one end and is withdrawn in the same direction through an opening in the opposite end of the chamber. However, in another form of the invention, illustrated in FIGS. 3 and 4, the third chamber is provided with a single opening through which the container is both introduced and withdrawn. A container of the type adapted to be employed in this manner and designated 70 is closed at both ends by compressing its wall and bonding the inner surfaces thereof together. The leading end of the container, that is, the end which is introduced first and withdrawn last, is sealed in such a manner that it will become unsealed in response to hydraulic pressure generated within the fluid contents of the container to provide an open mouth through which the fluid contents of the container are discharged. An opening is provided in one of the walls defining an end of chamber 44 through which container 70 is adapted to be introduced and moved into position with the leading end 72 of the container located in a recess 78 in the opposite end wall of chamber 44. The recess is provided so that the fluid-filled cavity of the container will extend to substantially the edges of the sheets between which it is located. The trailing end of the container, designated 74, is substantially longer than the leading end and extends through the opening to provide a leader by which container 70 may be grasped for withdrawing it from the chamber.

A manually operable device is provided in association with the opening for applying compressive pressure to the container as it is withdrawn through the opening and for closing the opening against the admission of actinic light after the container has been withdrawn. This device comprises a pair of pressure-applying elements 80 each having a generally flat portion 81 disposed against the surface of one of walls 16 on opposite sides of the opening and a dependent portion 82 which extends into the opening in juxtaposition with the dependent portion on the other element. A pair of recesses 84 are provided on opposite sides of the opening underlying flat portions 81 and a pair of compression springs 86 are provided in recesses 84 for urging elements 80 toward one another. Dependent portions 82 of elements 80 are adapted to engage the container for compressing it as it is withdrawn from chamber 44 between portions 82. In order to prevent light from entering the opening between portions 82, the opposed surfaces of said portions are provided with mating recessed section 88 and raised section 89 which interlock, when there is no container therebetween, to form a substantially lighttight seal. In a modification of the invention, dependent portions 82 may be provided which extend into chamber 44 and engage the margins of the sheets and apply compressive pressure through the margins of the sheets to the container as it is withdrawn from between the sheets through the opening. By virtue of this arrangement, the leading end of the container is wiped clean of any residual fluid composition so that the fluid does not come into contact with the dependent portions of the pressure-applying elements.

Flat portions 81 are substantially wider than end portions 82 and the opening, whereby they prevent light from entering the opening either directly or through recesses 84. Pressure-applying elements 80 are slidably secured to the camera by a retaining plate 90 which includes a slot 91 having an open portion at least coextensive with the opening and located in alignment therewith. Means are provided for spacing dependent portions 82 of elements 80 apart from one another to permit the introduction of a container into chamber 44. In the form shown, this last-mentioned means comprises an L-shaped member 92 including a V- or wedge-shaped section 94 underlying plate 90 between the latter and the end wall of chamber 44 and being slidable in the plane of flat portions 81 at a right angle to the direction of sliding movement of elements 80. The apex of V-shaped portion 94 extends between flat portions 81 and acts as a wedge for spacing elements 80 apart from one another when member 92 is moved toward and between the two elements. L-shaped member 92 also includes an upstanding engagement portion 96 which projects through slot 91 and provides means whereby the L-shaped member may be grasped and moved for spacing the pressure-applying elements apart from one another.

Heretofore the suggested practice for causing the fluid contents of the container to be ejected between the sheets has involved the compression of the container progressively as it is withdrawn from between the sheets. Other methods of ejecting the fluid contents of the container are possible and may be employed in the present invention. For example, a piston type element or closure may be provided in the container and is held stationary with respect to the sheets as the container is withdrawn from between the sheets whereby the piston moves in and with respect to the container, causing its fluid contents to be ejected. Containers, devices and processes of this type, suitable for incorporation into and use with the present apparatus and processes, are more fully shown and described in application Serial No. 553,287, filed December 15, 1955, in the name of Irving Erlichman, now Patent No. 3,037,670. Additional devices, useful for causing the ejection of the fluid contents of containers of the type shown during withdrawal from between the sheets and adapted to be associated with the herein disclosed apparatus, are described in the aforementioned patent applications, Serial Nos. 553,287 and 522,605 and in applications Serial Nos. 538,152, filed in the name of Edwin H. Land et al. (now Patent No. 2,833,192) and 538,048, filed in the name of Irving Erlichman, both on October 3, 1955 (now Patent No. 2,834,272).

Other forms of containers and methods of introducing a selected one of several containers between the sheets are possible and may be performed in the present invention. For example, the fluid reagents may be provided in containers which are adapted to be moved with the sheets between a pair of pressure-applying members for causing their fluid contents to be discharged between the sheets. Containers of this type may be introduced into the camera from the outside in a number of different ways or a plurality of different containers may be provided initially within the camera, which includes a device for introducing selected containers, one at a time, between the sheets. The pressure-applying members, instead of being fixed, may be urged toward one another by springs so that they will separate slightly for the added thickness of the container located between each pair of sheets.

The present invention may be incorporated into and performed by another form of camera of the type wherein an exposed photosensitive sheet is superposed with a second sheet and a fluid processing composition is spread between the sheets as they are withdrawn from the camera between a pair of pressure-applying members. This type of camera is illustrated in FIG. 5 and generally includes means for storing a plurality of photosensitive sheets and second sheets and means for advancing a photosensitive and second sheet following exposure of the former into superposition with one another within a lighttight chamber which is isolated from the exposure chamber by light-sealing means, and within which a fluid container may be positioned between the sheets. This camera, designated 100, includes a housing comprising an upper wall 102, side walls 104, rear wall 106 and lower wall 108. At least the lower wall is inclined at an angle with respect to the rear wall and in this case is inclined upward, while the side walls may converge toward one another. An exposure means, such as a conventional lens and shutter assemblage 110, is mounted on the forward portions of the upper, lower and side walls. Rear wall 106 is located with its rear surface substantially in the focal surface of the exposure means and is provided with an exposure aperture 107 through which light from the exposure means is transmitted to a photosensitive sheet positioned for exposure against the rear surface of the rear wall. A pair of pressure-applying members 112 and 114 are provided mounted between side walls 104 and form a pressure-generating gap 116 located substantially at the line at which rear wall 106 and lower wall 108 would intersect if extended.

Means are provided for closing the rear of the camera housing, storing a plurality of photosensitive sheets in stacked relation and locating the foremost photosensitive sheet of a stack thereof in position for exposure against the rear surface of wall 106. This means comprises a box-shaped magazine 118 adapted to be secured to the rear of the camera housing. The magazine contains a plurality of photosensitive sheets, designated 120, positioned in stacked relation within magazine 118 and urged forward by a pressure plate 122 and spring 123 mounted on rear wall 124 of the magazine. The magazine includes an upper end wall 126 having a raised boss 127 at which it is secured by means such as a detent spring 130 attached to upper wall 102 of the camera housing and a lower wall 128 having a boss or tongue 129 adapted to be locked in a matching recess 131 in the upper portion of pressure-applying member 112. Suitable means are provided for forming a light-tight seal between the walls of magazine 118 and the upper and side walls of the camera housing and pressure-applying member 112.

Means are provided for enclosing the stack of second sheets 140 and, in the form shown, comprise a similar box-shaped magazine 132 secured to the lower portion of the camera housing to provide, in conjunction with lower wall 108, a chamber within which the second sheets are stored and positioned during exposure of the photosensitive sheet. Magazine 132 includes a rear wall 133 and two end walls 134 and 136. The magazine is secured to the camera housing and rear end wall 134 by a boss or tongue 135 which is seated in a matching recess 138 in pressure-applying member 114 and at its forward end by a detent spring 139 attached to the forward portion of the camera housing. Suitable light-sealing means are provided for preventing light from entering the camera between the walls of magazine 132 and the side and lower walls of the housing and pressure-applying member 114. A pressure plate 142 and spring 143 are provided secured to rear wall 133 of the magazine for engaging and urging the rear end portions of second sheets 140 upward and rearward and serve a function to be described more fully hereinafter.

As a means for simultaneously advancing the foremost photosensitive sheet 120, located adjacent rear wall 106, and the foremost second sheet 140, located adjacent lower wall 108, into superposition with one another and through gap 116 between pressure-applying members 112 and 114, there is provided a pair of rolls 144 and 146 mounted with their axes parallel and with their surfaces in engagement with one another and respectively tangent to the plane of the rear surface of rear wall 106 and the lower surface of lower wall 108. By virtue of this arrangement the lower portion of the foremost photosensitive sheet 120 is pressed into frictional engagement with roll 144 by spring 123, while the rear portion of the foremost second sheet 140 is pressed into frictional engagement with roll 146 by spring 143. Rolls 144 and 146 are provided with friction-generating surfaces, for example of rubber, so that, when they are pivoted, respectively, in counterclockwise and clockwise directions (viewing FIG. 5), the foremost photosensitive and second sheets are moved substantially in their planes into contact with one another and in superposition with one another through gap 116 between pressure-applying members 112 and 114. The adjacent surfaces of pressure-applying members 112 which define gap 116 are preferably cylindrical and are tangent to the planes of the foremost photosensitive and second sheets whereby the sheets are readily guided between the pressure-applying members through the gap. Rolls 144 and 146, being in frictional engagement with one another, may be both rotated at the same speed through the same angle by rotation of one of the rolls, and for this purpose suitable manually operable crank means (not shown) are provided exterior of the camera connected to one of the rolls for rotating rolls 144 and 146 through an angle sufficient to advance a photosensitive sheet 120 and a second sheet 140 from their respective magazines through gap 116 a sufficient distance to provide a leader by which the two sheets may be grasped for drawing them through the gap from the camera.

The camera of FIG. 5 may be provided in a somewhat simplified form without rolls 144 and 146 and the mechanism for rotating the rolls. In this form of camera, the photosensitive sheets are connected to one another in succession by leaders and the second sheets are connected to one another in the same manner. Successive pairs of sheets 120 and 140 are drawn from the camera through gap 116 for spreading the fluid by drawing on the leaders connecting the sheets.

The foremost photosensitive and second sheets are disposed in planes located at right angles with respect to one another and are moved in said planes into superposition with one another so that they define a fluid-receiving space closely adjacent a line of contact within which the fluid contents of a container of the type described are intended to be discharged. According to the invention, the portions of the sheets defining the fluid-receiving space are positioned within a processing chamber which is light-sealed from another chamber wherein the photosensitive sheets are exposed so that the exposure frame of the photosensitive sheet is not exposed when the processing chamber is open to permit the introduction and withdrawal of a fluid container. In the form shown, exposure chamber 148 is separated from a processing chamber, designated 150, by a wall 152 extending between the lower end of rear wall 106 and the rear end of lower wall 108. Rolls 144 and 146 are located adjacent wall 152 between the latter and gap 116.

In the operation of the camera following exposure of a photosensitive sheet, rolls 144 and 146 are rotated through equal predetermined angles whereby portions of the photosensitive and second sheets are advanced through chamber 150 into superposition with one another within gap 116 and through the gap to the outside of the camera where they provide a leader for grasping and drawing the remainder of the sheets through the gap from the camera. As the photosensitive sheet is advanced downward by roll 144, a portion of the exposure frame is moved from across aperture 107 beneath roll 144 into processing chamber 150. To prevent exposure of this portion of the exposure frame during introduction of a container into the processing chamber, there is provided a light-shielding element 154 located between the rolls and passage 116 and having a flexible light-shielding member 156 for engaging the photosensitive sheet in the region of end wall 128 of magazine 118 whereby light is prevented from striking the portion of the photosensitive sheet extending between member 156 and roll 144. Light-shielding member 156 may comprise, as shown for example, a resilient metal plate or spring to which is secured a material such as a pile fabric, flocking, or the like adapted to engage the photosensitive sheet in a lighttight manner without scratching the sheet. In this regard, it might be noted that contact between the exposure frame of the photosensitive sheet and roll 144 may be prevented by constructing the roll so that it only engages the margins of the photosensitive sheet and not the intermediate portions thereof.

In an alternative embodiment, element 154 and member 156 may be eliminated with rolls 144 and 146 being located closer to the pressure-applying members. In this embodiment, the container would be introduced into chamber 150 before the photosensitive and second sheets have been moved into superposition. The construction of the means for compressing the container and light-sealing the opening through which it is moved would be like that shown in FIGS. 3 and 4 and which is adapted to prevent light from entering the chamber during and after withdrawal of the container. The sheets would then be moved into the processing chamber with the container already located in position and then the container would be withdrawn and its fluid contents spread between the sheets.

Figure 3:
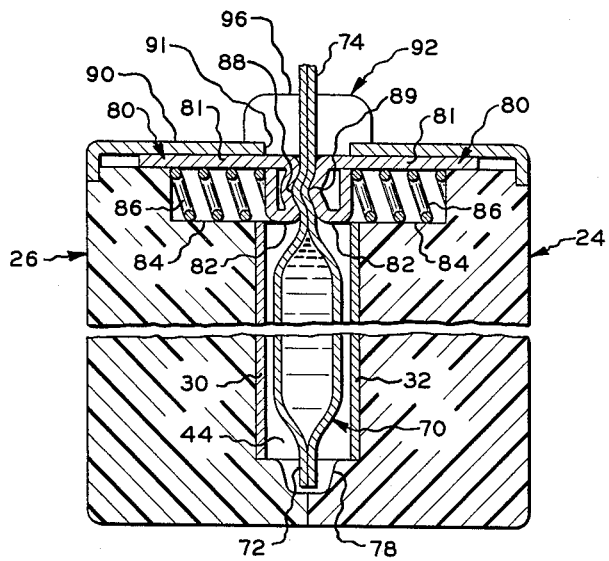
FIG. 3 is a view, similar to FIG. 2, illustrating another embodiment of the invention.

The construction of means for permitting containers of the type described to be introduced into and withdrawn from chamber 150, the means for compressing the containers as they are withdrawn, the means for sealing the opening or openings through which the containers are introduced into and withdrawn, the openings and the containers themselves may be substantially as shown in FIG. 2 or in FIGS. 3 and 4. The photosensitive and second sheets 120 and 140 are, of course, opaque to actinic light, and gap 116, between pressure-applying members 112 and 114, is of a predetermined width greater than the combined thickness of the two sheets and controls the thickness of the layer of processing fluid spread therebetween.

Until now, apparatus embodying the invention has been shown in the form of magazines or cameras adapted to the exposure and processing of photosensitive sheets, each containing a single exposure frame. The present invention is also adapted to incorporation into and performance by photographic apparatus employing photosensitive sheet materials in an elongated or roll form and containing a plurality of exposure frames. This apparatus may be said to comprise two general types, the first including apparatus, particularly cameras, wherein the photosensitive and second sheets are both opaque and are withdrawn from the camera as the fluid composition is spread between the sheets. The second includes apparatus, and particularly cameras, including an imbibition chamber into which the sandwich comprising the superposed photosensitive and second sheets, with a layer of processing fluid therebetween, is advanced during the processing period.

Figure 6:
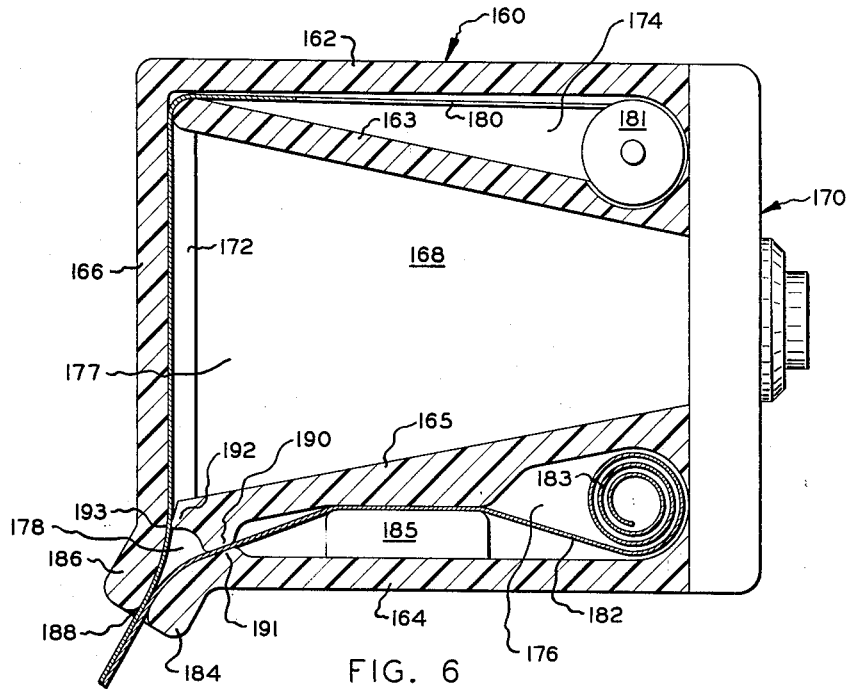

Apparatus of the first type and in the form of a box camera 160 is shown in FIG. 6 of the drawings. Camera 160 comprises an upper wall 162, lower wall 164, rear wall 166, side walls 168 and exposure means in the form of a conventional lens and shutter assemblage 170 mounted on the forward portions of the upper, lower and side walls. The camera includes at least a pair of intermediate walls 163 and 165 which converge toward one another at the front of the camera and provide a light path between the lens and a photosensitive frame positioned for exposure at the rear of walls 163 and 165 adjacent rear wall 166. A pair of guide tracks 172 may be provided on side walls 168 between upper and lower intermediate walls 163 and 165 for locating a frame of a photosensitive sheet for exposure. Intermediate walls 163 and 165 cooperate with rear wall 166 to define an exposure chamber 177 while upper intermediate wall 163 defines, in conjunction with upper wall 162, a first or upper storage chamber 174 for a supply of a photosensitive sheet material, designated 180, and lower intermediate wall 165 defines, in conjunction with lower wall 164, a second or lower storage chamber 176 for a supply of a second sheet, designated 182. A supply of photosensitive sheet 180 may be provided coiled around means such as a conventional spool 181 mounted in chamber 174, while second sheet 182 may be supplied either on a spool or as a loose roll 183 since the second sheet is not photosensitive.

Lower wall 164 and rear wall 166 are provided, respectively, with downwardly and rearwardly extending portions 184 and 186 which comprise a pair of pressure-applying members cooperating to define a pressure-generating gap 188 through which the superposed photosensitive sheets are movable for spreading a fluid composition in a layer therebetween. Lower intermediate wall 165 is provided with a pair of extended sections 190 and 192 which extend, respectively, to locations closely adjacent lower wall 164 and rear wall 166 and provide, in conjunction with said walls, narrow passages 191 and 193 through which the second and photosensitive sheets are movable respectively. At least passage 191 is sealed against the admission of light and extended portions 184 and 186 cooperate with extended sections 190 and 192 to form a fourth or processing chamber 178 isolated from exposure chamber 177 into which a container of processing fluid may be introduced between portions of the photosensitive and second sheets extending through passages 191 and 193 into superposition with one another with gap 188.

The means permitting introduction and withdrawal of containers of the type described into and from chamber 178 and for compressing the containers and sealing the chamber may be substantially as shown and described hereinbefore. The two sheets, being opaque, are withdrawn through gap 188 for spreading the processing fluid. Since the photosensitive sheet includes a plurality of exposure frames, indexing means 185 are preferably provided for arresting the movement of the sheets each time an exposure frame of photosensitive sheet 180 is in position for exposure. Indexing means, responsive to engagement with a portion of sheet 182 and suitable for incorporation into either chamber 174 or chamber 176 and adapted to engage portions of either of the sheets for arresting their movement, are well known in the art, the specific type of indexing mechanism employed being immaterial. It is desirable to sever each sandwich containing a processing exposure frame from the remainder of the sheets as the sandwich is withdrawn from the camera through gap 188 and, accordingly, suitable sheet-severing means may be provided for containing the sheets so as to leave a leader extending from gap 188 which may be employed for withdrawing the sheets from the camera. Alternatively, the sheets may be precut or perforated so that they will tear readily along predetermined lines exterior of the camera to provide a leader when movement of the sheets through the gap is arrested by the indexing mechanism.

Figure 7:
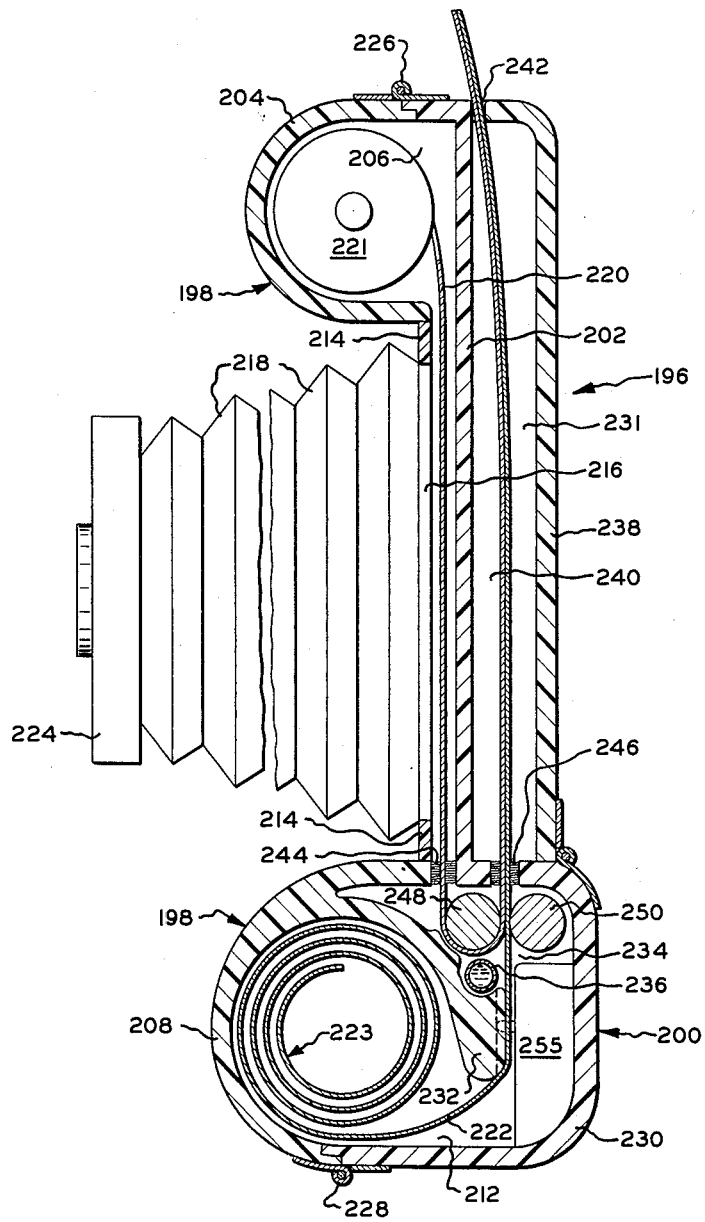

Another form of camera of the roll film type and embodying the invention is illustrated in FIG. 7 of the drawings. This camera, designated 196, is a folding camera, rather than a box camera of the type previously illustrated, and includes a housing comprising three relatively movable sections, a forward section 198, a rear section 200 and an intermediate section 202. Forward section 198 includes an upper wall 204 defining a storage chamber 206 in which may be mounted a supply of a photosensitive sheet 220, a lower wall 208 defining a second storage chamber 212 in which may be mounted a supply of a second sheet 222, and a central reentrant section 214 having an aperture 216 through which exposure is made, and mounting a conventional folding bellows 218 on the front of which is secured lens and shutter assembly 224. Any conventional erecting mechanism (not shown) may be provided for mounting the lens and shutter assembly and holding the bellows rigidly in open position, the latter defining, in conjunction with the aperture and intermediate section, an exposure chamber in which frames of a photosensitive sheet are exposed.

Photosensitive sheet 220 is preferably mounted on a spool 223 of conventional design within chamber 206 and extends from chamber 206 through the exposure chamber across aperture 216. The rear of reentrant section 214 is provided with suitable guide tracks for positioning frames of the photosensitive sheet for exposure. Intermediate section 202 is pivotally secured to forward section 198 at the upper end of the camera by such means as hinge 226 and extends downward closing the rear storage chamber 206 and across aperture 216. Intermediate section 202 may include or comprise a suitable pressure plate or other means for holding frames of the photosensitive sheet in position for exposure across aperture 216 and against the guide tracks.

Rear section 200 is pivotally secured at the lower end of the camera to lower wall 208 by such means as a hinge 228 and comprises a lower rear wall 230 which extends at least partially upward behind the camera and side walls 231 extending upward to adjacent hinge 228. Suitable latch means (not shown) are provided for retaining rear section 200 in the operative position illustrated. Lower rear wall 230 cooperates with lower wall 208 to define storage chamber 212. Within this storage chamber and attached to lower wall 208 is an intermediate wall 232 adapted to divide the storage chamber into two chambers one of which is designated 234 and will be termed the processing chamber. It is within this processing chamber 234 that the fluid contents of a container, here shown as 236, are distributed between the sheets and are spread in a thin layer between the sheets by movement thereof between a pair of pressure-applying members.

A door 238 is provided at the rear of the camera hinged at one end to rear wall 230 and extending upward between side walls 231 to the upper end of the camera. Door 238 cooperates with intermediate section 202 to define an imbibition chamber 240 within which a sandwich, comprising an exposed frame of photosensitive sheet 220, an area of second sheet 222 and a layer of processing composition therebetween, is advanced from processing chamber 234 and is allowed to remain during a predetermined processing period. A passage 242 is provided in the upper end of the processing chamber for drawing sheet materials into and through the chamber and a suitable means is provided for closing and rendering passage 242 lighttight.

Second sheet 222 is provided preferably in the form of a loose roll 223 within storage chamber 212 and extends around the end of intermediate wall 232 into processing chamber 234 into superposition with photosensitive sheet 220 which extends into processing chamber 234 between the lower end of intermediate section 202 and reentrant section 214. A passage 244 is provided between reentrant section 214 and the lower end of intermediate section 202 through which the photosensitive sheet enters the processing chamber. A suitable light seal in the form, for example, of pile fabric or flocking is provided in passage 244 between reentrant section 214 and intermediate section 202 for engaging the photosensitive sheet and preventing light from being admitted through the passage from chamber 234 into the exposure chamber. Rear wall 230 and the lower end of intermediate section 202 define a passage 246 between processing chamber 234 and imbibition chamber 240 and suitable light-sealing means in the form, for example, of flocking or pile fabric are provided for preventing light from passing through passage 246 from one of the processing and imbibition chambers to the other. Thus, processing chamber 234 is isolated, insofar as the passage of light is concerned, from the exposure chamber and the imbibition chamber and, in the form shown, also from the portion of storage chamber 212 in which the second sheet is stored. This latter is unnecessary since the second sheet is not photosensitive in the preferred embodiment.

In the form shown the fluid-spreading means comprises a pair of pressure-applying rolls 248 and 250 mounted within chamber 234 opposite passage 246 on, respectively, intermediate section 202 and rear housing section 200. Suitable spring means (not shown) are provided for urging the rolls toward one another. The fluid-spreading means may comprise any type of rigid members providing a gap between which the two sheets are advanced and, for example, may comprise the walls of passage 246 between processing chamber 234 and imbibition chamber 240. Photosensitive sheet 220 extends through passage 244 into processing chamber 234, around roll 248 between the latter and roll 250 and through passage 246 into the imbibition chamber. Second sheet 222 extends around the end of intermediate wall 232 into processing chamber 234 into superposition with sheet 222 between rolls 248 and 250. The two sheets, as they come together between the rolls, form a fluid-receiving space within which the processing fluid is adapted to be discharged from a container 236. The means permitting the introduction and withdrawal of container 236 and the mechanism for causing the fluid contents of the container to be discharged between the sheets as it is withdrawn from chamber 234 may be substantially the same as that previously described and shown in FIGS. 2 through 4.

In the operation of the camera of FIG. 7, a spool of photosensitive sheet 220 is positioned within chamber 206 while a roll of second sheet 222 is positioned within chamber 212. The leading ends of the two sheets are preferably connected to one another by a leader so that the photosensitive sheet extends through the exposure chamber across aperture 216 where it is joined to the second sheet, the roll 223 of the latter being located within chamber 212. Section 202 is then pivoted to the operative position shown so that it defines the aforementioned storage chamber 206, the exposure chamber within which the photosensitive sheet is exposed and passage 244 through which sheet 220 enters chamber 234. The leader connecting the ends of the photosensitive and second sheets is then positioned behind roll 248 and intermediate section 202, and rear section 204 mounting roll 250 is pivoted to the closed position shown so that the two sheets extend between rolls 248 and 250, through passage 246 into imbibition chamber 240 and the end of the leader extends through passage 242 at the upper end of the camera. This leader may then be grasped by the operator for drawing a frame of the photosensitive sheet from storage chamber 206 into position for exposure in alignment with aperture 216.

An indexing mechanism, designated 255 and adapted to function in response to engagement with portions of second sheet 222, is provided within chamber 212 for arresting the movement of the two sheets when a frame of the photosensitive sheet is in position for exposure. At some time, either before or after exposure of a frame of the photosensitive sheet, and preferably after exposure is made, a container of processing fluid is introduced, in the manner described, into processing chamber 234 between the sheets and is withdrawn so as to cause its fluid contents to be discharged in the fluid-receiving space between the sheets. The indexing mechanism is then released and the leader extending through passage 242 is grasped for drawing the exposed frame of photosensitive sheet 220 and an area of second sheet 222 between rolls 248 and 250 into the imbibition chamber. Spreading of the fluid composition between the sheets is effected by the rolls as the frame and area are moved in superposition therebetween. At the end of a predetermined processing period, rear door 238 may be opened for the purpose of separating the area of the second sheet containing a positive print, formed by silver halide diffusion transfer-reversal, from the exposed and processed frame of the photosensitive sheet. During movement of an exposed frame and area into imbibition chamber 240, another frame of photosensitive sheet 220 is automatically positioned for exposure so that the process may be repeated in the same manner.

Best results are assured when the exposure, which determines the choice of the processing composition to be used, is determined exactly and this can be done with certainty only at the instant of exposure. This may be readily accomplished, for example, by incorporating an exposure meter in the structure of the camera and coupling the exposure meter with the shutter, so that the indicating means of the meter is automatically fixed in position at the instant exposure is made. By fixing the indicating means of the exposure meter at the instant exposure is made, the operator may be certain of the precise conditions of exposure, something which is impossible in conventional photographic methods wherein the operator first determines the exposure conditions with the aid of a meter and then sets the diaphragm stop and shutter speed accordingly, prior to making the actual exposure, during which time the exposure conditions may vary. With the construction of the invention, the operator may read the meter to determine the exposure and select the proper processing material at any time following exposure and be assured that the conditions indicated by the meter were those under which the exposure was made. The meter may, in fact, be calibrated to designate, directly, the container carrying the proper processing fluid which is appropriate for the exposure rather than light values, as is customary with most meters.

The term "exposure," as used in the claims, is intended to mean the light reaching the photosensitive material and usually measured in meter-candle-seconds.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for exposing and processing photosensitive sheet materials, said apparatus comprising, in combination:

a housing providing an exposure chamber and a processing chamber located adjacent and communicating with one another;

means for positioning a photosensitive sheet comprising first and second portions within said housing with said first portion located in position for exposure within said exposure chamber and said second portion located within said processing chamber;

means for positioning a second sheet comprising first and second portions superposable, respectively, with said first and second portions of said photosensitive sheet, within said apparatus with said first portion of said second sheet located apart from said first portion of said photosensitive sheet and said second portion of said second sheet located within said processing chamber;

a first pair of juxtaposed members for engaging said photosensitive and second sheets intermediate said processing and exposure chambers and preventing the passage of light from one of said chambers to the other;

a second pair of juxtaposed members for engaging said photosensitive and second sheets at the entrance to said processing chamber to prevent the admission of light into said processing chamber and distribute a fluid reagent in a layer between said first portions of said sheets during and in response to withdrawal movement of said first portions in superposition between and in engagement with said members of said second pair from said processing chamber; and means including at least an opening in said housing communicating with said processing chamber permitting a container carrying said fluid reagent to be introduced into said processing chamber between said second portions of said sheets and thereafter withdrawn from said processing chamber from between said second portions of said sheets;

the last-mentioned means including means associated with said opening for closing said opening against the admission of light into said processing chamber and engaging said container during withdrawal thereof for discharging the fluid contents of said container between said second portions of said sheets.

2. The photographic apparatus of claim 1 in which said first and second pairs of members compressively engage said photosensitive and second sheets.

3. The photographic apparatus of claim 1 in which said last-mentioned means comprise a single opening communicating with said processing chamber and permitting both introduction and withdrawal of said container.

4. The photographic apparatus of claim 1 in which said housing includes end and side walls providing said processing chamber with passages between said side walls at opposite sides of said processing chamber, each of said passages being closed by one of said pairs of members, and said last-mentioned means include an opening located in one of said end walls in position for admitting said container for movement in a direction transversely of the direction of movement of said sheets into said processing chamber through one of said passages and from said processing chamber through the other of said passages.

5. Photographic apparatus of claim 4 in which said last-mentioned means include an opening in each of said end walls through which said container is movable, and said openings are located in substantial alignment intermediate said side walls.

6. Photographic apparatus for exposing and processing photosensitive sheet materials, said apparatus comprising, in combination:

a housing providing an exposure chamber and a processing chamber communicating with one another;

means for positioning a photosensitive sheet for exposure within said housing with a first portion of said photosensitive sheet located in said exposure chamber in position for exposure and a second portion of said photosensitive sheet located in said processing chamber;

means for exposing said photosensitive sheet comprising a single exposure aperture and a single speed shutter;

means including an opening in said housing through which a container of processing liquid may be introduced into and withdrawn from said processing chamber;

means associated with said opening for dispensing said liquid from said container during withdrawal of said container from said processing chamber; and means providing a passage for admitting withdrawal movement of said sheet from said processing chamber and for distributing said processing liquid in contact with said photosensitive sheet during withdrawal thereof from said processing chamber through said passage.

References Cited in the file of this patent
UNITED STATES PATENTS
2,834,272    Erlichman _____ May 13, 1958